United States Patent Office 2,840,588
Patented June 24, 1958

2,840,588

PROCESS FOR THE PREPARATION OF DIFLUORO-SILYLENE AND THE POLYMERS THEREOF

Donald C. Pease, Wilmington, Del., assignor to E. I. du Pont de Nemours and Company, Wilmington, Del., a corporation of Delaware No Drawing. Application March 22, 1956
Serial No. 573,075

5 Claims. (Cl. 260—448.2)

This invention relates to difluorosilylene, its preparation, its polymerization, and its reaction with inorganic and organic compounds.

Difluorosilylene, i. e., $SiF_2$, silicon difluoride, or silicon subfluoride, has not heretofore been prepared. A material polymeric in nature and containing as many as ten or more repeating $SiF_2$ units has been prepared. See Schmeisser, Colloquium of the Inorganic Chemistry Section of the International Union of Pure and Applied Chemistry, Munster, September 2-6, 1954, page 28. Schmeisser states that attempts to obtain difluorosilylene directly by reaction of silicon tetrafluoride with silicon at temperatures up to the melting point of the latter were unsuccessful, although Troost et al., Ann. Chem. (5) 7 452, 464-5, have indicated a synthesis of a white subfluoride of silicon in this manner.

This invention has as an object the preparation of difluorosilylene. A further object is the preparation of polymers of the same. Another object is the preparation of an intermediate for the introduction of the difluorosilylene, —$SiF_2$—, radical into organic compounds. A further object is the preparation of fluorohalogenosilanes. Still another object is the preparation of new products containing silicon and fluorine and elements of organic or inorganic compounds capable of adding monomeric difluorosilylene. Other objects will appear hereinafter.

These objects are accomplished by the present invention of (A) the preparation of difluorosilylene and polydifluorosilylenes by passing silicon tetrafluoride at an absolute pressure less than 50 mm. of mercury over silicon in the form of elemental silicon, silicon carbide, silicon-metal alloys or binary silicides of polyvalent metals at a temperature in the range of about 1100 to about 1400° C. and immediately quenching the off-gas to a temperature below about 0° C. and (B) the preparation of fluorosilicon compounds by reacting difluorosilylene and/or polymers thereof with (B1) a different (other than silicon and fluorine) negative element of the 7th group, i. e., halogens of atomic weight above 20, (B2) telogens or chain transfer agents, preferably of chain transfer constant of at least $10 \times 10^{-4}$, or (B3) addition polymerizable ethylenically unsaturated monomers.

To obtain difluorosilylene in the reaction of silicon tetrafluoride with silicon, silicon carbide, polyvalent metal silicides, or metal/silicon alloys, it is essential that the reaction be conducted under carefully controlled conditions of temperature, pressure, and quenching. The temperature in the reaction zone should be at least 1100° C., since little or no reaction takes place at lower temperatures. The upper limit of temperature is not particularly critical but preferably does not exceed the melting point of silicon, about 1400° C., since at higher temperatures silicon appears in the reaction products in undesirable amounts. The preferred reaction temperature is within the range of 1200 to 1300° C.

The absolute pressure in the system should not exceed 50 mm. of mercury. The formation of difluorosilylene is not observed at higher pressures, possibly because of disproportionation of the difluorosilicon radicals initially formed to silicon and silicon tetrafluoride. Preferably, the operating pressure should not exceed 30 mm. of mercury, and still more preferably it is below about 10 mm. of mercury.

To obtain difluorosilylene it is essential that the reaction product be very rapidly cooled. While the chemical processes which occur during this cooling, or quenching, are not well understood, it has been demonstrated that quenching of the product from the reaction temperature to a temperature no higher than about 0° C. is essential to the success of the operation. Moreover, quenching must be very rapid. The time during which the reaction product is cooled, i. e., the time of transition from the reaction temperature to about 0° C., should not exceed one second, and it is preferred to cool to at least —50° C. within from 0.1 second to 0.001 second or less. With any given apparatus, the efficiency of the quenching will be primarily a function of the gas velocity, which in turn is a function of the feed rate and lowering the pressure results in higher gas velocities and more efficient quenching. In practice, when operating on a laboratory or moderate scale, suitable quenching is achieved by causing the off-gas to impinge on a cold surface, e. g., a wall at a temperature between about —50 and —200° C., placed as close as possible to the reaction zone.

The reactants in the process of this invention are silicon tetrafluoride and silicon. Silicon tetrafluoride is a gas at ambient temperatures and is commercially available as 96% $SiF_4$. Optimum results are obtained by the use of silicon tetrafluoride further purified by distillation, or sublimation, although it can be employed without further purification. The silicon reactant can be elemental silicon, either silicon per se which is preferred, or a silicon alloy, e. g., a ferrosilicon, for example a 50/50 ferrosilicon, or a binary polyvalent metal silicide, e. g., FeSi and $TiSi_2$, or carbon silicide (silicon carbide). Elemental silicon can be used as the technical product without purification, and either in the amorphous or crystalline form. Any binary polyvalent metal silicide can be used, the most useful of such compounds being calcium silicide, magnesium silicide, titanium silicide, chromium silicide, manganese silicide, iron silicide, cobalt silicide and nickel silicide. The solid reactant is best used in as finely divided form as possible to insure good reactivity. However, in fixed bed systems particle size must also be adjusted to permit throughput of silicon tetrafluoride at efficient rates and to assure physical stability. Different particle size requirements are imposed if the solid reactant is handled as a "fluid" in countercurrent flow systems. If desired, an inert carrier gas can be used, such as argon, helium, or nitrogen.

The difluorosilylene which forms in the hot reaction zone is passed immediately through a zone at such a temperature that all or most of the off-gas is quenched to below 0° C. within one second or less. At very low cold wall temperatures, such as that of liquid nitrogen (—196° C.) the reaction product is obtained as an amber colored solid film, whose color changes to pale yellow or white at temperatures in the neighborhood of —78° C. or higher. Thus, at very low temperatures, i. e., well below —78° C., the product consists of, or contains in substantial amount, frozen difluorosilicon radicals (monomeric difluorosilylene, $SiF_2$), and these radicals polymerize as the temperature increases to —78° C. to give a more stable, solid polydifluorosilylene, $(SiF_2)_n$, having a lower extinction coefficient. When the cold wall is kept at a higher temperature, e. g., —78° C., the product which collects on it is a pale red, transparent polydifluorosilylene. This polymer loses its color in a few hours at room temperature but usually retains its transparency. Thus, polydifluorosilylene can be obtained as a colorless self-supporting film having appreciable toughness.

While the product of the $SiF_4$/silicon (or silicide) reaction is essentially $SiF_2$ (monomer and polymer), the purity of the silylene fluoride monomer and of the polymer therefrom is perhaps lowered by the presence of silicon monofluoride, SiF, or silicon trifluoride, $SiF_3$, units.

It is sometimes necessary to conduct all manipulations and handling of polymeric difluorosilylene in an inert atmosphere, since the product as obtained from the reaction frequently ignites spontaneously in contact with air. Possible sources of this high reactivity are the sensitivity of Si—Si bonds in the polymer to oxidation, the accidental inclusion of amorphous silicon in the polymer or the presence of some polymeric silicon monofluoride.

Difluorosilylene reacts readily, even at temperatures below —78° C., with organic compounds containing carbon-to-carbon bonds, and particularly carbon-to-carbon double bonds. For example, unsaturates such as ethylene, tetrafluoroethylene or acrylonitrile react even at very low temperature with difluorosilylene, presumably the free radicals —$SiF_2$—. The resulting products are solids containing silicon and fluorine in addition to elements from the organic unsaturate. These solids are insoluble in solvents which dissolve the normal, i. e., unmodified, polymers of these unsaturates. In the case of saturated organic compounds those of high transfer constant are particularly reactive, e. g., isopropylbenzene, methyl ethyl ketone. See Price, Reactions at Carbon-Carbon Double Bonds (Interscience 1946) page 84; Gadkary et al., Makromol Chem. 17 32 (1955). Difluorosilylene, also reacts nearly quantitatively with halogens, e. g., chlorine or bromine, to give the corresponding dihalodifluorosilanes.

The following examples in which parts are by weight are illustrative of the invention.

EXAMPLE I

The apparatus was a ¾" bore quartz tube packed for a portion of its length, this portion being heated in an electric furnace (12" long), with lumps of silicon approximately cubical in shape and ¼" on edge. The inlet end of the tube was attached to a manometer and a gas burette containing gaseous silicon tetrafluoride. The outlet end of the tube led to a glass trap of the cold finger type, this trap being for the purpose of quenching the off-gas and being located as close as possible to the heated reaction zone. The quenching trap was connected through other cold traps to a second manometer and a vacuum pump. By regulating the flow of silicon tetrafluoride, the pressure on the inlet side was maintained at about 5 mm. By cooling the traps at the outlet end with liquid nitrogen (B. P. —196° C.), the gaseous products were removed so completely that the outlet pressure was of the order of 0.04 mm. Under these conditions it was estimated that the off-gas was cooled to below 0° C. well within one-tenth of a second after leaving the hot zone.

Before starting the run, the silicon in the tube was heated to 1200° C. under 0.04 mm. pressure to remove volatile materials that might have been absorbed on it. After this preliminary heating had been continued for a few hours, the quenching trap and the other traps were cooled with liquid nitrogen. Nothing accumulated in the quenching trap during 10 minutes while the silicon was held at 1200° C. under a pressure of 0.04 mm., showing that the silicon was properly degassed. Silicon tetrafluoride, purified by preferential condensation, was then admitted at the rate of 250 ml. (measured at 25° C.—760 mm.) per hour from the burette, and almost immediately an amber solid collected on the cold finger condenser or quencher. Pressure at the inlet end of the reaction tube was about 3 mm. and at the last liquid nitrogen trap was about 0.05 mm. of mercury. The quantity of the solid increased as long as the flow of silicon tetrafluoride was maintained. After this had been stopped and the furnace turned off, the liquid nitrogen was allowed to evaporate from the quenching trap, and the volatiles, at least part of which was unreacted silicon tetrafluoride, evaporated from this trap and condensed in the other cold traps. The color of the solid in the quenching trap changed from amber to a pale yellow at a temperature as low as —78° C. Thus, monomeric difluorosilylene had been frozen on the cold wall at —196° C. and was now polymerizing. When the system had reached room temperature, nitrogen was admitted and the quenching trap was transferred to a box with an inert atmosphere, in which a sample for analysis was taken from the trap. This material was found to analyze closely for $(SiF_2)_n$, since it contained 42.7% silicon and 57.1% fluorine, as compared with the calculated amounts of 42.4% silicon and 57.6% fluorine. The solid ignited in contact with air. In some experiments, conversions of silicon tetrafluoride as high as 40% were achieved, the balance being recovered.

When these experiments were repeated under essentially the same conditions, but with the quenching trap at —78° C. instead of —196° C., difluorosilylene and/or its polymer was collected in the trap as before. Much of it was pale red and transparent. This product lost its color in a few hours at room temperature but in general retained its transparency. This polymer was obtained as a colorless, flexible self-supporting film having appreciable toughness, comparable to that of an ethyl cellulose film of the same thickness. When the quenching trap was maintained at 0° C. no polymer was collected on it and it appeared that the quenching was insufficient within this trap to cool the off-gas below 0° C. in less than a second. However, polymer was collected in the adjacent trap at —196° C.

The importance of operating at reduced pressure was shown by the fact that little or no product was obtained at pressures above 50 mm. However, at pressures of the order of 50 mm., and less, polymeric difluorosilylene was formed as a very viscous film on the cold wall. Reducing the pressure further increased the conversion and gave solid products.

High conversion of silicon tetrafluoride to polymeric difluorosilylene was also achieved in fixed bed systems with a silicon packing of particle size in the range between that passed by a 10 mesh per inch classifying screen but retained by a 20 mesh screen to a size small enough to pass through a 42 mesh screen but retained by a 100 mesh screen.

EXAMPLE II

Silicon tetrafluoride was passed over silicon carbide in lumps of about ⅜ inch diameter at 1220–1280° C. at the rate of about 1 liter (measured at 25° C.—760 mm.) per hour, in an apparatus and under conditions otherwise closely resembling those of Example I. At the end of the run the cold finger condenser was warmed to room temperature and the polydifluorosilylene was collected in an inert atmosphere. The polymer was recovered in an amount corresponding to about an 8% conversion of the silicon tetrafluoride. This polymer was stable under atmospheric conditions. It contained 43.2% silicon, 49.7% fluorine, and 1.6% of carbon. The latter may have been present as difluoromethylene groups or as an accidental inclusion of silicon carbide.

EXAMPLE III

Silicon tetrafluoride was passed over calcium silicide in lumps of about ⅛ inch diameter at 1250° C. and at a rate of about 1.3 liters (measured at 25° C.—760 mm.) per hour, under conditions that were otherwise similar to those of Example I. Polydifluorosilylene was collected in the quenching trap in amount equivalent to about a 30% conversion of the silicon tetrafluoride. The polydifluorosilylene was stable under atmospheric conditions. It contained 49.3% silicon and 52.3% fluorine. This product dissolved in aqueos sodium hydroxide with liberation of hydrogen.

Difluorosilylene can be reacted with addition polymerizable ethylenically unsaturated monomers, as shown in Example IV–VII below.

EXAMPLE IV

Difluorosilylene was reacted with ethylene as follows: The apparatus of Example I was used except that the tubular quartz reactor was fitted, between the furnace and the quenching trap, with a side tube leading to a second gas burette. The second reactant could be introduced in gaseous form from this burette at any desired time.

After degassing the silicon in the tube by heating it to 1200° C. under a pressure of about 1 mm., the quenching trap was cooled with liquid nitrogen. About 0.01 mole of ethylene was slowly admitted from the second gas burette and frozen in the quenching trap as a white solid. Then, during a period of about two hours, silicon tetrafluoride was passed through the tube at such a rate that the pressure near the vacuum pump was maintained at about 0.1 mm. During this time a layer of amber-colored solid accumulated in the quenching trap. At the end of the run, the liquid nitrogen in the quenching trap was allowed to evaporate while the system was maintained under low pressure. As the trap warmed up, the color of the solid changed from amber to pale yellow. The final product was a pale yellow solid which possessed the elements from both ethylene and difluorosilylene. The solid contained 12.11% carbon, 2.34% hydrogen, 31.66% silicon, and 30.87% fluorine. The portion unaccounted for may have been oxygen, which could have combined with reactive silicon containing compounds in the product because of incomplete exclusion of air while transfers were being made.

This solid ignited spontaneously on contact with air, and considerable ash remained. In contrast with polymerized ethylene, the solid did not dissolve in boiling xylene, nor was it even swollen by xylene. On contact with 10% aqueous sodium hydroxide nearly all the solid dissolved with gas evolution. The alkaline solution was filtered and acidified. A gelatinous white precipitate was obtained, indicating that at least some of the silicon had dissolved in the alkaline solution as a sodium silicate.

EXAMPLE V

Acrylonitrile was reacted with difluorosilylene, using the apparatus of Example IV and similar conditions. Liquid nitrogen was added to the quenching trap and about 0.03 mole of acrylonitrile was evaporated and frozen on the cold finger of the quenching trap. Silicon tetrafluoride was admitted and an amber-colored product began to accumulate in the quenching trap. After about one hour, acrylonitrile was admitted into the off-gas from the hot reaction zone, the acrylonitrile supply flask being maintained at −78° C. so that the pressure near the vacuum pump remained at a few tenths of a millimeter. The acrylonitrile vapors and the difluorosilylene emerging from the hot reaction zone reacted, and a solid was deposited just beyond the furnace as well as in the quenching trap.

The yellow solid recovered from the quenching trap did not ignite in the air. It contained 5.22% nitrogen and 31.62% fluorine. In contrast with acrylonitrile polymer, this solid did not dissolve in hot dimethylformamide, although it was swollen by it. The solid which deposited from the gas phase near the acrylonitrile inlet contained 3.91% nitrogen. Thus, even in the gas phase at very short contact times and low pressures, the difluorosilylene was active enough to give a solid product containing acrylonitrile.

EXAMPLE VI

Tetrafluoroethylene was reacted with difluorosilylene using the apparatus and conditions of Example IV, except that arrangements were made for the tetrafluoroethylene and difluorosilylene streams to merge just beyond the hot silicon, where the temperature was about 1100° C. To the extent possible, the relative gas flows were adjusted so that reactions might occur according to the following equations:

$$\tfrac{1}{2}SiF_4 + \tfrac{1}{2}Si \rightarrow SiF_2$$
$$SiF_2 + CF_2 = CF_2 \rightarrow (SiF_2-CF_2-CF_2)_n$$

Gas addition was also adjusted to maintain pressure at the inlet end of the tube below 5 mm. and after the last liquid nitrogen trap at about 0.05 mm.

Soon after addition of reactants had started, a yellow material began to accumulate on the cold finger of the quenching trap. There was no deposition of solid in the vicinity of the merging gas streams, but the quantity of product in the quenching trap increased as the run progressed.

After about 0.1 mole of tetrafluoroethylene and 0.04 mole of silicon tetrafluoride had been added (about 3 hours) the run was discontinued. The temperature of the cold trap was brought up to −78° C. However, even before this temperature was reached, the color of the solid material in the trap changed to nearly white. The system was then brought up to room temperature and atmospheric pressure. The solid reaction product was collected in an inert atmosphere. It contained 10.9% carbon, which is close to the calculated carbon content (10.3%) of the polymer $(SiF_2-SiF_2-CF_2-CF_2)_n$. A film of this polymer of 0.01 inch thickness was transparent and self-supporting.

EXAMPLE VII 2,3-dimethyl-1,3-butadiene was admitted into the off-gas of the reaction between silicon and silicon tetrafluoride under the conditions of Example V. The solid polymeric material isolated from the quenching tube was separated into a carbon tetrachloride-soluble fraction and a carbon tetrachloride-insoluble fraction, both of which contained carbon, hydrogen, silicon and fluorine. The carbon tetrachloride-soluble fraction was a colorless, gummy material. The carbon tetrachloride-insoluble fraction was a pale yellow solid showing appreciable toughness in film form.

Difluorosilylene can be reacted with halogen of atomic weight above 20, i. e., chlorine, bromine and iodine, as illustrated in Example VIII below.

EXAMPLE VIII

Bromine was reacted with difluorosilylene in an apparatus and under conditions similar to Example IV except that the gas streams were merged just beyond the hot silicon where the temperature was about 350° C. Addition of the reactants was adjusted so that reactions might occur according to the following equations:

$$\tfrac{1}{2}SiF_4 + \tfrac{1}{2}Si \rightarrow SiF_2$$
$$SiF_2 + Br_2 \rightarrow SiF_2Br_2$$

Pressures were maintained at about the level of those of Example VI. After about 0.16 mole of silicon tetrafluoride and 0.39 mole of bromine had been added, which required about 4½ hours, the run was discontinued. The temperature of the quenching tube was gradually raised to 25° C. while the material which had accumulated in it was transferred to a still. Distillation gave dibromofluorosilane, boiling at 15–18° C. (thermocouple temperature).

*Analysis.*—Calculated for $SiBr_2F_2$: Br, 70.77%; F, 16.82%. Found: Br, 70.24%; F, 16.52%.

The formation of dibromodifluorosilane furnishes additional proof that difluorosilylene is formed during the reaction of silicon tetrafluoride with silicon. Conversion to dibromodifluorosilane was 68% and the yield was practically quantitative.

The great reactivity of difluorosilylene is further illustrated by the following example.

EXAMPLE IX

Difluorosilylene was generated in a quartz tube by passing silicon tetrafluoride over silicon at about 1250° C. and under a pressure of about 4 mm. Chlorodifluoromethane (also under a pressure of about 4 mm.) was cracked at 750° C. The stream of the gaseous products of the cracking reaction, i. e., hydrogen chloride, difluoromethylene radicals, tetrafluoroethylene, and higher perfluorinated hydrocarbons, was merged with the difluorosilylene stream at about 1100° C. This gaseous mixture was quenched as rapidly as possible at −196° C. A solid polymeric material was isolated from the quenching tube. This contained 40.61% silicon, 52.14% fluorine, 2.08% chlorine, 2.45% carbon, and 0.05% hydrogen.

Difluorosilylene reacts with organic compounds having carbon-to-carbon bonds other than those illustrated in the foregoing examples, and especially with those having carbon-to-carbon aliphatic unsaturation, such as styrene, vinyl chloride, vinyl fluoride, 1,3-butadiene and the like. By controlling the relative proportions of reactants, it is possible to obtain products containing from very small amounts, e. g., 0.05 to 1% by weight, to very large amounts, e. g., from 75 to 90% by weight, of $SiF_2$ units. The stability of the resulting products towards oxygen decreases as the number of silicon-to-silicon bonds present therein increases (it is known that such bonds are easily ruptured). These products are resistant to solvents which dissolve unmodified polymers of the unsaturated compounds.

Of the polymeric products obtainable by reaction of difluorosilylene with other materials (e. g., unsaturates, telogens, etc.) those which are stable towards oxygen are useful, because of their film-forming qualities, in the preparation of protective coatings on substrates such as metals; of self-supporting films and sheets, useful for example in laminated glass structures; and of molded objects. The lower molecular weight polymeric products have marked lubricating properties and are useful as greases or ingredients of greases. These lubricating properties are also present after reaction with oxygen or water of the polymeric materials which are oxygen sensitive, and these materials are also useful as lubricants for glass or metal surfaces notwithstanding their initial instability. Polymeric difluorosilylene and the above disclosed polymeric reaction products of difluorosilylene with other materials possess water-repellent properties and act as waterproofing agents for paper, textiles and fibrous surfaces in general. This property is likewise observed in the polymeric materials which have reacted with oxygen or water.

The monomeric products obtained by reaction of difluorosilylene with halogens of atomic weight above 20, e. g., dichlorodifluorosilane and dibromodifluorosilane, can undergo metathetical reactions to give products that contain $SiF_2$ groups. Examples of such products are $(C_2H_5O)_2SiF_2$ and $(SiF_2OCH_2CH_2O)_n$, obtained by reacting dibromodifluorosilane with ethanol and ethylene glycol, respectively (see U. S. Patent 2,465,339, which also mentions various uses for these products).

Pyrolysis in an inert atmosphere of the polydifluorosilylene produced by the process of this invention results in volatilization of silicon in a form that deposits as an inert, chemically resistant coating on metals, glass and other surfaces. This is a convenient and useful method of applying a protective coating of silicon on various objects, e. g., in preparing silicon mirrors. For example, adherent silicon coatings were deposited on titanium, molybdenum, steel and glass by subliming solid polydifluorosilylene onto these surfaces under very low pressure (about 0.1 mm.) and at a temperature in the range of 250° to 500° C. A silicon coating deposited on titanium in this manner decreased the rate of oxidation of titanium in air fivefold. Silicon coatings similarly deposited but in an atmosphere of hydrogen at about 1 mm. mercury pressure showed unusually high electrical resistivity. Similarly glass can be masked except for certain spots, channels, etc., then coated, the mask washed off and the silicon design left on the glass for electronic utilizations.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A process for the preparation of difluorosilylene which comprises bringing silicon tetrafluoride in contact, at a temperature in the range from about 1100° C. to about 1400° C. and at an absolute pressure of not more than about 50 mm. of mercury, with a member of the class consisting of elemental silicon, silicon alloys, silicon carbide, and the polyvalent metal silicides and immediately quenching the reaction products to a temperature below about 0° C.

2. Process for the preparation of compounds containing silicon and fluorine which comprises bringing silicon tetrafluoride in contact, at a temperature in the range from about 1100° C. to about 1400° C. and at an absolute pressure of up to 50 mm. of mercury, with a member of the class consisting of elemental silicon, silicon alloys, silicon carbide, and binary polyvalent metal silicides and immediately bringing the reaction product in contact with an organic compound containing a carbon-to-carbon bond.

3. The invention of claim 2 in which the carbon-to-carbon bond is a double bond.

4. The polymeric reaction product of difluorosilylene and an organic compound containing a carbon-to-carbon double bond.

5. The polymeric reaction product of difluorosilylene and an addition-polymerizable, ethylenically-unsaturated, organic compound.

References Cited in the file of this patent

UNITED STATES PATENTS

| | | |
|---|---|---|
| 2,474,087 | Barry et al. | June 21, 1949 |
| 2,483,373 | Rochow | Sept. 27, 1949 |
| 2,488,487 | Barry et al. | Nov. 15, 1949 |
| 2,598,434 | Mohler et al. | May 27, 1952 |
| 2,651,651 | Simons et al. | Sept. 8, 1953 |

OTHER REFERENCES

Mellor, "Comprehensive Treatise on Inorganic and Theoretical Chemistry" (1925), vol. 6, page 934.